US009393958B2

(12) United States Patent
Stählin et al.

(10) Patent No.: US 9,393,958 B2
(45) Date of Patent: Jul. 19, 2016

(54) METHOD AND SYSTEM FOR VALIDATING INFORMATION

(75) Inventors: Ulrich Stählin, Eschborn (DE); Thomas Grotendorst, Eschborn (DE)

(73) Assignee: Continental Teves AG & Co. oHG (DE)

(*) Notice: Subject to any disclaimer, the term of this patent is extended or adjusted under 35 U.S.C. 154(b) by 146 days.

(21) Appl. No.: 13/805,718

(22) PCT Filed: Jun. 22, 2011

(86) PCT No.: PCT/EP2011/060474
§ 371 (c)(1),
(2), (4) Date: Dec. 20, 2012

(87) PCT Pub. No.: WO2011/161177

PCT Pub. Date: Dec. 29, 2011

(65) Prior Publication Data
US 2013/0090803 A1    Apr. 11, 2013

(30) Foreign Application Priority Data

Jun. 23, 2010  (DE) .................. 10 2010 030 455

(51) Int. Cl.
*B60W 30/09* (2012.01)
*G06K 9/00* (2006.01)
(Continued)

(52) U.S. Cl.
CPC ............... *B60W 30/09* (2013.01); *G01M 17/00* (2013.01); *G06K 9/00805* (2013.01); *G06K 9/6289* (2013.01); *G08G 1/163* (2013.01); *G08G 1/164* (2013.01)

(58) Field of Classification Search
CPC .. B60W 30/09; G01M 17/00; G06K 9/00791; G06K 9/6289; G08G 1/163; G08G 1/164

USPC ........................................................ 701/30.3
See application file for complete search history.

(56) References Cited

U.S. PATENT DOCUMENTS 7,813,843 B2 * 10/2010 Patel .................... G08G 1/00
701/1
8,000,897 B2 *  8/2011 Breed et al. ................. 701/301
(Continued)

FOREIGN PATENT DOCUMENTS

DE    10 2005 017 422 A1    10/2006
DE    10 2007 048 809 A1     7/2008
(Continued)

OTHER PUBLICATIONS

English translation of FR 2896594A1 and english translation of DE 102007048809 A1.*
(Continued)

*Primary Examiner* — Mussa A Shaawat
*Assistant Examiner* — Yazan A Soofi
(74) *Attorney, Agent, or Firm* — RatnerPrestia

(57) ABSTRACT

A method for validating information, wherein a first information item is detected essentially continuously, at least for the duration of its relevance, by a vehicle-to-X communication device, wherein a second information item is detected at the same time as the first information item by at least an individual sensor or a group of sensors, wherein the at least one individual sensor or the group of sensors is coupled at the data level to the vehicle-to-X communication device and wherein the first and/or second information items are validated by reconciling an information content of the first and second information items in the case of corresponding information content. The method is distinguished by the fact that the second information item is detected in an essentially discontinuous fashion.

17 Claims, 3 Drawing Sheets

(51) Int. Cl.
  *G08G 1/16* (2006.01)
  *G06K 9/62* (2006.01)
  *G01M 17/00* (2006.01)

(56) References Cited

U.S. PATENT DOCUMENTS

| | | | |
|---|---|---|---|
| 2010/0066534 A1* | 3/2010 | Takeichi et al. | 340/540 |
| 2012/0218093 A1* | 8/2012 | Yoshizawa et al. | 340/435 |
| 2014/0148998 A1* | 5/2014 | Goudy et al. | 701/41 |

FOREIGN PATENT DOCUMENTS

| | | | |
|---|---|---|---|
| DE | 102007048809 | * | 7/2008 |
| DE | 10 2007 041 121 A1 | | 3/2009 |
| DE | 10 2007 058 192 A1 | | 6/2009 |
| DE | 10 2008 061 301 A1 | | 6/2009 |
| DE | 10 2008 013 366 A1 | | 9/2009 |
| DE | 10 2008 001 672 A1 | | 11/2009 |
| DE | 10 2009 034 214 A1 | | 4/2010 |
| DE | 10 2010 002 092 A1 | | 12/2010 |
| FR | 2 896 594 | | 7/2007 |
| FR | 2896594 A1 | * | 7/2007 |
| WO | WO 03/001474 A2 | | 1/2003 |
| WO | WO 03001474 A2 | * | 1/2003 |

OTHER PUBLICATIONS

Wender et al. ["3D vehicle detection using a laser Scanner and a video camera" IET Intelligent Transport System, Bd. 2, No. 2, Jun. 9, 2008, pp. 105-112, XP006030986, ISSN:].*

English translation of FR 2896594 A1.*

Wender et al., "3D Vehicle Detection Using a Laser Scanner and a Video Camera," 6*th* European Congress on ITS, Jun. 18-20, 2007, Aalborg.

Rusconi et al., "I-Way, intelligent co-operative system for road safety," Proceedings of the 2007 IEEE Intelligent Vehicles Symposium, Istanbul, Turkey, Jun. 13-15, 2007, pp. 1056-1061.

International Search Report for PCT/EP2011/060474, mailed Oct. 20, 2011.

German Search Report for German Patent Application DE 10 2011 077 998.1, mailed Feb. 13, 2012.

* cited by examiner

METHOD AND SYSTEM FOR VALIDATING INFORMATION

CROSS REFERENCE TO RELATED APPLICATIONS

This application is the U.S. National Phase Application of PCT/EP2011/060474, filed Jun. 22, 2011, which claims priority to German Patent Application No. 10 2010 030 455.7, filed Jun. 23, 2010, the contents of such applications being incorporated by reference herein.

FIELD OF THE INVENTION

The invention relates to a method for validating information wherein a first information item is detected essentially continuously, at least for the duration of its relevance, by a vehicle-to-X communication device, wherein a second information item is detected at the same time as the first information item by at least one individual sensor or a group of sensors, wherein the at least one individual sensor or the group of sensors is coupled at the data level to the vehicle-to-X communication device, and wherein the first and/or second information items are validated by reconciling information content of the first and second information items in the case of corresponding information content, to a system for validating information, for carrying out a method comprising: a first information item is detected essentially continuously, at least for the duration of its relevance, by a vehicle-to-X communication device, a second information item is detected at the same time as the first information item by at least one individual sensor or a group of sensors, the at least one individual sensor or the group of sensors is coupled at the data level to the vehicle-to-X communication device, and the first and/or second information items are validated by reconciling information content of the first and second information items in the case of corresponding information content, wherein the second information item is detected in an essentially discontinuous fashion, the system comprising: a vehicle-to-X communication device and at least one individual sensor or a group of sensors, wherein the vehicle-to-X communication device is coupled at the data level to the at least one individual sensor or to the group of sensors via an electronic information reconciling module, wherein the vehicle-to-X communication device detects a first information item, and while it is detecting said information item it outputs it to the electronic information reconciling module, wherein the vehicle-to-X communication device outputs the first information item essentially continuously to the electronic information reconciling module, wherein the at least one individual sensor or the group of sensors detects a second information item, essentially at the same time as the detection of the first information item by the vehicle-to-X communication device, and while it is detecting said information item it outputs it to the electronic information reconciling module, and wherein the electronic information reconciling module carries out a software algorithm for reconciling the information content of the first and second information items, and when corresponding information content is detected it validates the first and/or the second information item, and to the use thereof.

BACKGROUND OF THE INVENTION

While vehicle-to-X communication (V2X communication) is currently still in a state of research, surroundings sensors and driver assistance systems based thereon are already known in the prior art and are becoming increasingly widespread. In addition, growing merging of sensors is taking place in the course of continuous improvement of information processing, information detection and therefore also of the reliability of such driver assistance systems. It is therefore possible, for example firstly to determine a distance from a vehicle travelling ahead by means of a radar sensor. An additional distance measurement can then be performed by means of, for example, a stereo camera which is also present and which confirms the distance information determined by the radar sensor, or rejects and/or improves said distance information. If the distance information can be confirmed, it is considered to be validated and is distinguished by a particular level of reliability.

A similar way of employing other surroundings sensor information to validate information detected by means of surroundings sensors is also used, for example, in what is referred to as "Target Validated Braking", and is known from DE 10 2008 061 301 A1, which is incorporated by reference. Here, a radar signal from a control unit is validated by means of a camera signal by said camera signal confirming that the radar signal is reflected by a vehicle. An alternative distance measurement by means of a stereo camera is not necessary. Owing to the validation by means of a second sensor, the reliability of the information is particularly high and permits safe intervention in a vehicle brake device.

Even more wide ranging merging of different surrounding sensors such as, for example, radar sensors, camera sensors, lidar sensors and also a telematics system, which is also understood here to be a surrounding sensor, is described in DE 10 2007 058 192 A1, which is incorporated by reference. By means of a central control unit, the respectively nonredundant information of an individual sensor is checked by comparing analytically with information from another sensor. In this way it is possible, if appropriate, to bring about information redundancy which forms the basis for safety-related interventions into the vehicle control system.

DE 10 2010 002 092 A1, which is incorporated by reference, discloses a communication device having a data-pre-processing unit for reducing, validating and checking the plausibility of data received by means of V2X communication. For this, not only information from surrounding sensors such as, for example, radar and camera, but also additionally also from vehicle sensors such as, for example, ESP sensors, is used. In addition, information from a global position determining system can be included.

DE 10 2007 048 809 A1, which is incorporated by reference, describes a method according to which the signals of various surroundings sensors are combined in order to generate a model of the surroundings. In addition to the signals of the surroundings sensors, data received via V2X communication are also included in the model of the surroundings. By virtue of the combination of the different sensors with one another and/or of the sensors with the V2X communication system, the problems and weaknesses of the individual sensors can be compensated by the strengths of the other sensors.

However, combining information in conjunction with information validation is problematic in the case of information which is detected by means of V2X communication since V2X communication is frequently used in conjunction with information which cannot be detected by surroundings sensors. It is therefore possible, for example, to receive, by means of V2X communication, information about objects which, to the receiver, lie concealed behind a bend or are covered by an obstacle. Since such objects cannot be reliably detected by surroundings sensors, the corresponding V2X information cannot be readily validated by means of surroundings sensor systems. A safety-related intervention into the vehicle control on the basis of the V2X information is therefore frequently not possible.

SUMMARY OF THE INVENTION

The invention is based on reliably validating an information item detected by a vehicle-to-X communication device by means of a surroundings sensor even in such situations in which the surroundings sensor cannot reliably sense the information to be validated.

This is achieved according to the invention by means of the method for validating information, wherein a first information item is detected essentially continuously, at least for the duration of its relevance, by a vehicle-to-X communication device, wherein a second information item is detected at the same time as the first information item by at least one individual sensor or a group of sensors, wherein the at least one individual sensor or the group of sensors is coupled at the data level to the vehicle-to-X communication device, and wherein the first and/or second information items are validated by reconciling information content of the first and second information items in the case of corresponding information content, wherein the second information item is detected in an essentially discontinuous fashion and the system for validating information, for carrying out a method comprising: wherein a first information item is detected essentially continuously, at least for the duration of its relevance, by a vehicle-to-X communication device, wherein a second information item is detected at the same time as the first information item by at least one individual sensor or a group of sensors, wherein the at least one individual sensor or the group of sensors is coupled at the data level to the vehicle-to-X communication device, and wherein the first and/or second information items are validated by reconciling information content of the first and second information items in the case of corresponding information content, wherein the second information item is detected in an essentially discontinuous fashion, the system comprising: a vehicle-to-X communication device and at least one individual sensor or a group of sensors, wherein the vehicle-to-X communication device is coupled at the data level to the at least one individual sensor or to the group of sensors via an electronic information reconciling module, wherein the vehicle-to-X communication device detects a first information item, and while it is detecting said information item it outputs it to the electronic information reconciling module, wherein the vehicle-to-X communication device outputs the first information item essentially continuously to the electronic information reconciling module, wherein the at least one individual sensor or the group of sensors detects a second information item, essentially at the same time as the detection of the first information item by the vehicle-to-X communication device, and while it is detecting said information item it outputs it to the electronic information reconciling module, and wherein the electronic information reconciling module carries out a software algorithm for reconciling the information content of the first and second information items, and when corresponding information content is detected it validates the first and/or the second information item, wherein the at least one individual sensor or the group of sensors outputs the second information item in an essentially discontinuous fashion to the electronic information reconciling module.

According to the inventive method for validating information, a first information item is detected essentially continuously, at least for the duration of its relevance, by a vehicle-to-X communication device, and a second information item is detected at the same time as the first information item by at least one individual sensor or a group of sensors. The at least one individual sensor or the group of sensors is coupled at the data level to the vehicle-to-X communication device. The first and/or second information items are validated by reconciling information content of the first and second information items in the case of corresponding information content. The method according to the invention is distinguished by the fact that the second information item is detected in an essentially discontinuous fashion. This provides the advantage that even a first information item which has been obtained by means of vehicle-to-X communication can be reliably validated in an easy way even though it cannot be confirmed continuously by means of another sensor or group of sensors. If the first information item is detected continuously and the information content of the first information item is identical to the information content of the second information item, it is possible to assume with a very high degree of probability with respect to the different physical properties of the detection method of the first and second information items that the second information item is still valid even in an interruption of detection or when detection is aborted. The invention therefore makes use of the realization that a second information item which can be detected repeatedly or only once for a brief time by means of an individual sensor or a group of sensors is essentially applicable even in those time periods in which it cannot be detected in this way.

The term "continuous detection" is understood in the context of the invention to mean detection of an information item by means of a sensor or a vehicle-to-X communication device which is uninterrupted over multiple measuring cycles and processing cycles. The term "discontinuous detection" is, on the other hand, understood to mean detection over multiple measuring cycles and processing cycles which is possible only with interruptions or else the detection of an information item which is possible only over a very small number of measuring cycles and processing cycles.

Preferably there is provision that the at least one individual sensor is a sensor of the generic type:
  radar,
  lidar,
  laser scanner,
  ultrasound,
  mono camera,
  stereo camera,
  wheel speed sensor,
  acceleration sensor,
  rotational speed sensor or
  steering angle sensor.

These are generic types of sensors which are typically used in the field of motor vehicles and which essentially permit comprehensive detection and sensing of the surroundings of a vehicle and at least partially of the state of the vehicle as well. At the present time, a large number of vehicles are already equipped on a standard basis with a plurality of sensors of the specified generic types and this number will increase further in future. The additional level of expenditure on equipment for implementing the method according to the invention in a motor vehicle is therefore low.

In a further preferred embodiment there is provision that the group of sensors is a group of individual sensors of the same generic type and/or of different generic types. Combining individual sensors to form a group of sensors provides the advantage that weaknesses of one generic type of sensor can be compensated by the strengths of another generic type of sensor. When a sufficiently large number of different generic types of sensor are combined, a model of the surroundings of the vehicle or a model of the state of the vehicle which is as complete as possible can therefore be produced at virtually any time.

In a further particularly preferred embodiment there is provision that the information contents of the information items of the individual sensors of the group of sensors are merged to form a common composite information item, wherein, in particular, the common composite information item constitutes the second information item. By virtue of the fact that the information contents of the information items of the individual sensors are merged, for the method according to the invention information content of every second individual information item no longer has to be reconciled with the information content of the first information item. As a result, the method is speeded up and simplified. For further vehicle control devices and vehicle assistance systems which access sensor information there is also the advantage that only a single information item has to be processed, which information item also contains all the essential data.

Expediently there is provision that first and second information items contain a position and/or direction of movement and/or speed and/or generic type of an object. Such information contents are often of critical importance for the safety of a vehicle. In order to be able to assess a traffic situation correctly, the driver, a corresponding vehicle control device or a driver assistance system firstly requires information about the position of an object. In this way, for example a first assessment as to whether the object constitutes a risk of collision can take place. In so far as the direction of movement and the speed of the object are also known, the assessment can be improved to the effect that a possible risk of collision can be assessed more precisely by reconciliation with the driver's own direction of movement and speed. Finally, the generic type of the object is also significant since, for example, a collision with a vehicle which is parked at the edge of the road is to be preferred to that with a pedestrian.

In a further preferred embodiment, there is provision that the information contents of the first and second information items are not merged. By virtue of the fact that continuous merging does not occur, the information content of the first information item can be reconciled at any time with the information content of the second information item, on the basis of which the first and/or second information items can be validated.

Expediently there is provision that the first and/or second information items are no longer categorized as being validated if the first information item is no longer detected essentially continuously. As soon as the first information item is no longer detected in an essentially continuous fashion, it must be assumed that the information content of the first information item is no longer valid. Since the second information item is also detected in an essentially discontinuous fashion, there is no reliable information item available any longer on the basis of which validation would be possible. This provides the advantage that there can be an appropriate reaction to an unreliable information situation.

Furthermore, it is advantageous that the information content of the validated first information items and/or validated second information items is made available at least to a driver assistance system in a vehicle. It is therefore possible to use the validated and, under certain circumstances, safety-critical information item independently of the driver. The driver assistance system may be, for example, a braking assistant which detects imminent emergency braking and prepares the brake system by precharging the brake cylinders and the associated feed lines for a more rapid response.

According to a further preferred embodiment of the invention there is provision that the validated first information items or validated second information items have a high degree of reliability which is sufficient for a vehicle control intervention. As a result, an autonomous intervention into the vehicle control is made possible, which intervention can even be designed to override a driver input. A corresponding vehicle control intervention may, for example, be autonomous full braking in order to avoid an accident or an autonomous avoidance maneuver in order to avoid an accident.

There is preferably provision that the information content of the first information item is used to reduce a threshold value of an object detection process, wherein the object detection process is performed by means of the at least one individual sensor and/or the group of sensors. This provides the advantage that improved and accelerated object detection by means of the at least one individual sensor and/or the group of sensors is made possible since the statistical probability with which an object in the sensor raw data has to be detected is reduced. The at least one individual sensor and/or the group of sensors receive, by means of the first information item, a target presetting according to which the sensor raw data is selectively searched.

The present invention also relates to a system for validating information, which system carries out, in particular, a method according to the invention. The system comprises a vehicle-to-X communication device and at least one individual sensor or a group of sensors, wherein the vehicle-to-X communication device is coupled at the data level to the at least one individual sensor or to the group of sensors via an electronic information reconciling module. The vehicle-to-X communication device detects a first information item, and while it is detecting said information item it outputs it to the electronic information reconciling module, wherein the vehicle-to-X communication device outputs the first information item essentially continuously to the electronic information reconciling module. The at least one individual sensor or the group of sensors detects a second information item, essentially at the same time as the detection of the first information item by the vehicle-to-X communication device, and while it is detecting said information item it also outputs it to the electronic information reconciling module. The electronic information reconciling module carries out a software algorithm for reconciling the information content of the first and second information items, and when corresponding information content is detected it validates the first and/or the second information item. The system according to the invention is distinguished by the fact that the at least one individual sensor or the group of sensors outputs the second information item in an essentially discontinuous fashion to the electronic information reconciling module. The system according to the invention therefore comprises all the necessary means for carrying out the method according to the invention and it can easily permit reliable validation of information even if the second information item cannot be detected in an essentially discontinuous fashion.

It is advantageous that the vehicle-to-X communication device exchanges information on the basis of at least one of the following types of link:
WLAN link, in particular according to IEEE 802.11,
ISM link (Industrial, Scientific, Medical Band),
ZigBee,
Bluetooth,
UWB,
Infrared link and/or
Mobile radio link.

These types of link provide different advantages and disadvantages here depending on the type and wavelength. WLAN links permit, for example, a high data transmission rate and a rapid link setup. On the other hand, ISM links provide only a relatively low data transmission rate but are highly suited for transmitting data around obstacles to visibility. Infrared links in turn also provide a low data transmission rate. Mobile radio links are ultimately not adversely affected by obstacles to visibility and provide a good data transmission rate. However, on the other hand, the link setup is comparatively slow. The combination and simultaneous or parallel use of a plurality of these types of link provide further advantages since in this way the disadvantages of individual types of link can be compensated for.

In a further preferred embodiment of the invention there is provision that an electronic information merging module is assigned to the group of sensors, which electronic information merging module merges the information contents of the information items of the individual sensors of the group of sensors to form a common composite information item, wherein, in particular, the common composite information item constitutes the second information item. This provides the advantage of simple and accelerated reconciliation of information since the information content of every second individual information item no longer has to be reconciled with the information content of the first information item. Vehicle control units and vehicle assistance systems to which the second information item is made available also only have to process a second information item instead of a plurality of second information items.

The system is preferably distinguished by the fact that the electronic information reconciling module and the electronic information merging module comprise partially or completely common data processing means. As a result, the information reconciling module and the information merging module are at least partially integrated, which both simplifies the manufacturing process and reduces the production costs as well as ensuring effective and rapid linking of data. Effective and rapid linking of data is particularly advantageous here since the information merging module and the information reconciling module process at least partially identical data records.

Furthermore it is advantageous that the electronic information reconciling module and/or the electronic information merging module are assigned to any desired vehicle control unit, wherein they are, in particular, partially or completely identical to an electronic computing module which is assigned to the vehicle control unit. As a result, further simplification potentials and production cost saving potentials are obtained since recourse can be made to already present components of other vehicle control units. In addition, this leads to improved data linking between the information merging module and the information reconciling module, on the one hand, and the corresponding vehicle control unit, on the other.

Furthermore, the present invention relates to the use of the method for validating information, and of the system for validating information in a motor vehicle.

BRIEF DESCRIPTION OF THE DRAWINGS

Further preferred embodiments can be found in the dependent claims and the following description of an exemplary embodiment with reference to figures, of which:

DETAILED DESCRIPTION OF THE INVENTION

Figure 1:
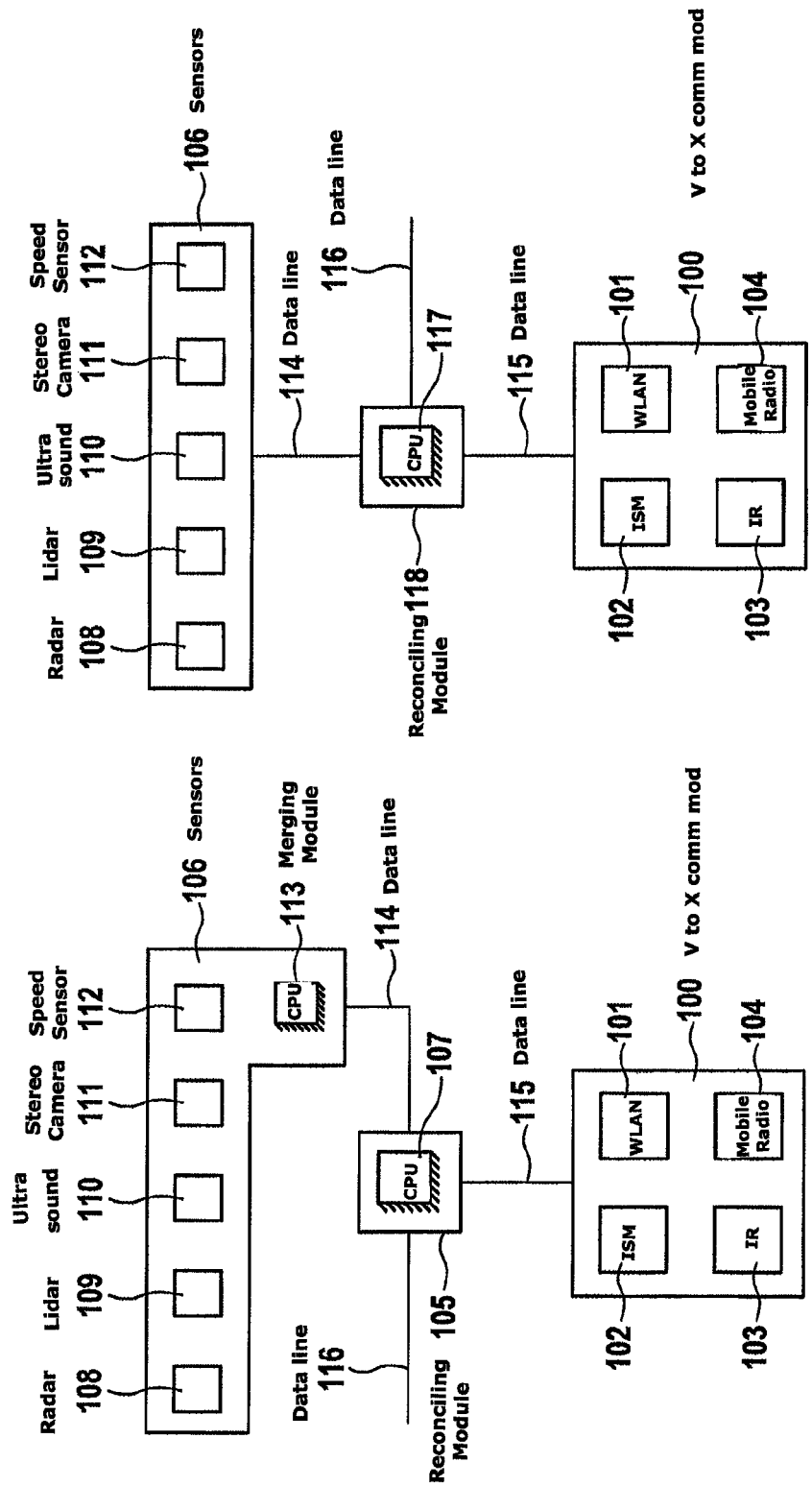
FIG. 1a is a schematic view of a possible design of a system according to the invention.
FIG. 1b is a schematic view of a possible alternative design of a system according to the invention.

FIG. 1a is a schematic and exemplary view of a possible design of the system according to the invention for validating information. The exemplary system comprises vehicle-to-X communication device 100, which in turn comprises WLAN module 101, ISM module 102, infrared communication module 103 and mobile radio module 104. WLAN module 101 is designed for communication according to the communication standard IEEE 802.11p. By means of modules 101-104, the vehicle-to-X communication device 100 can therefore exchange information items with other vehicles, infrastructure device and central data servers on different transmission paths. The exemplary system also comprises the information reconciling module 105 and group 106 of sensors. The group 106 of sensors is a group of individual sensors 108-112 of a different generic type. In this exemplary embodiment, the group 106 of sensors is composed of the radar sensor 108, the lidar sensor 109, ultrasound sensors 110, stereo camera 111 and wheel speed sensors 112. Furthermore, the group 106 of sensors comprises the microprocessor 113 which carries out a software algorithm in order to produce a common composite information item. An information merging module in the form of the microprocessor 113 is therefore assigned to the group 106 of sensors. The software algorithm for producing a common composite information collects the information of the individual sensors 108-112 which is combined to form the group 106 of sensors, analyzes the information contents of the information items from individual sensors 108-112 and generates therefrom a common composite information item. The composite information item contains the entire information items content of the individual information items by means of individual sensors 108-112. The vehicle-to-X communication device 100 and the group 106 of sensors are coupled to the information reconciling module 105 via data lines 114 and 115. The composite information items from the group 106 of sensors and the information items detected by the vehicle-to-X communication device 100 are then output to the information reconciling module 105 which, by means of the microprocessor 107, carries out a software algorithm for reconciling the information contents of the composite information items and the information detected by the vehicle-to-X communication device 100. If the information reconciling module 105 detects as identical both the information content described by the vehicle-to-X communication device 100 and the information content described by the group 106 of sensors, for example the information is validated by the vehicle-to-X communication device 100. Since, by virtue of the physical properties of the wavelengths used for the detection of information, the vehicle-to-X communication device 100 is capable of detecting information which cannot be detected by the group 106 of sensors or can only be detected briefly and unclearly, reconciliation of the information contents cannot take place at any desired time. Therefore, validation of the information detected by means of the vehicle-to-X communication device (100) would also be possible only for the time periods in which the corresponding composite information items are detected. In order nevertheless to permit reliable validation of the information detected by the vehicle-to-X communication device 100 in this case, for example only brief and unclear detection of the composite information item for the validation of the information detected by means of the vehicle-to-X communication device (100) is also permitted for the duration of the detection of the information which is detected by means of the vehicle-to-X communication device (100). As a result, in this case reliable validation of the information detected by the vehicle-to-X communication device 100 can also be carried out, which is a precondition for the passing on of the corresponding information content to a driver assistance system (not illustrated) via the data line 116.

In a further exemplary embodiment in FIG. 1a, the vehicle-to-X communication device 100 comprises an information merging module (not illustrated) which merges the information contents of the information detected by means of the WLAN module 101, the ISM module 102, the infrared communication module 103 and the mobile radio module 104 to form a common communication information item. The common communication information item is then output to the information reconciling module 105 via the data line 115.

FIG. 1b shows by way of example a possible alternative design of the system according to the invention. In contrast to FIG. 1a, the group 106 of sensors comprises, for example, no separate microprocessor which merges the information from individual sensors 108-112 to form a common composite information item. Instead, the information items from individual sensors 108-112 are transmitted via the data line 114 directly to the combined information merging module and the information reconciling module 118 which comprises the microprocessor 117. The microprocessor 117 is more powerful than the microprocessor 107 in FIG. 1a since in comparison it has to carry out numerous computing operations per time unit. The microprocessor 117 firstly merges the information from individual sensors 108-112 to form a common composite information item and then carries out reconciliation of the information content of the composite information item with the information content of the information detected by means of the vehicle-to-X communication device 100. In so far as corresponding information content is detected, the corresponding information which is detected by means of the vehicle-to-X communication device 100 is validated and made available to a driver assistance system via the data line 116.

In a further exemplary embodiment in FIG. 1b, the combined information merging module and information reconciling module 118 are integrated into a brake control device (not illustrated). The microprocessor 117 carries out both computing operations for merging information and for reconciling information as well as, for example, computing operations for brake control.

Figure 2:
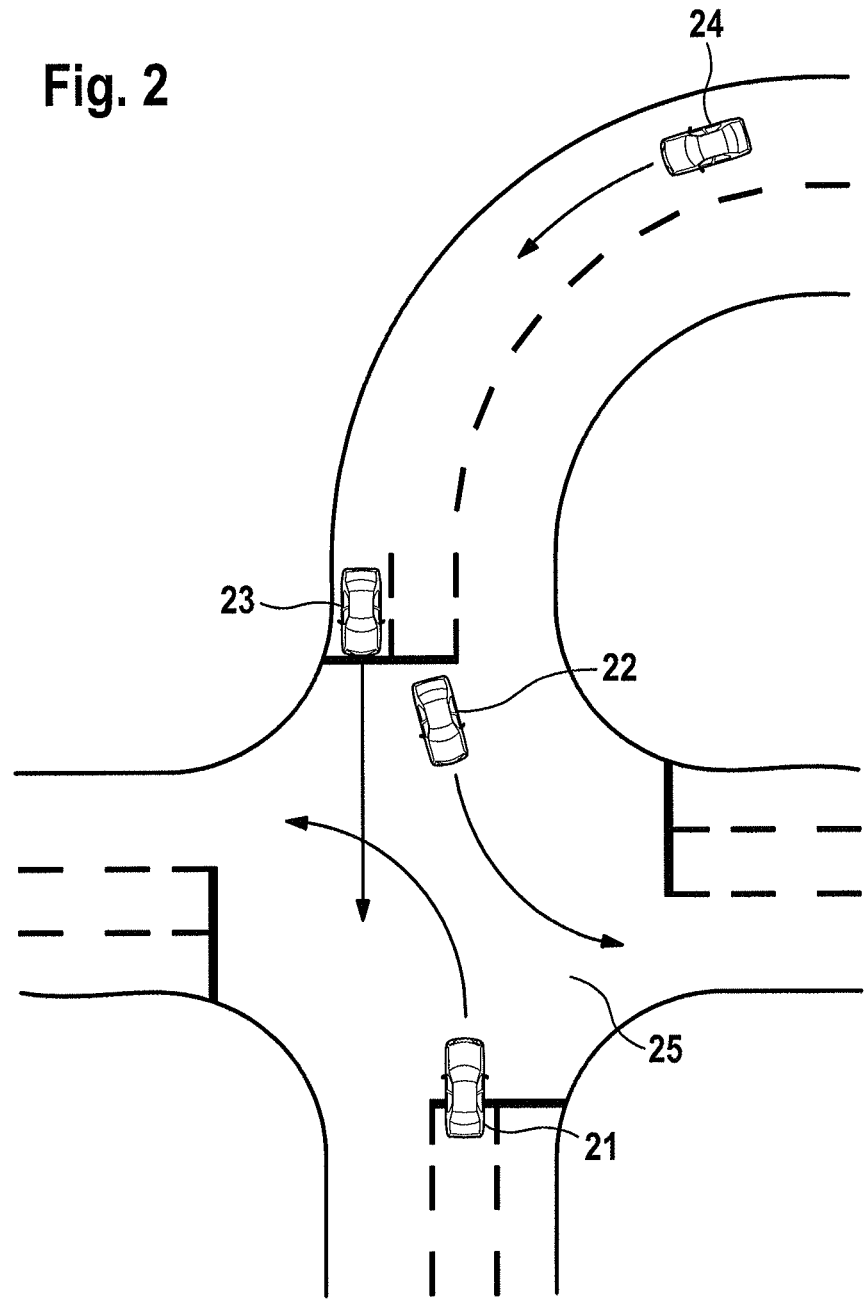
FIG. 2 shows a traffic situation on a heavily used road in which the method according to the invention is used.

FIG. 2 illustrates schematically by way of example a traffic situation with vehicles 21, 22, 23 and 24, in which traffic situation the method according to the invention is used. The planned directions of travel of vehicles 21-24 are each illustrated by corresponding arrows. The vehicle 21 is equipped with the system according to the invention for validating information and plans a maneuver of turning off to the left at the intersection 25. The driver's view of vehicle 23 from vehicle 21 is blocked by the oncoming vehicle 22, which also plans to perform a maneuver of turning off to the left, with the result that the driver cannot perceive the vehicle 23. The vehicle 23 plans to travel over the intersection 25 in a straight line and therefore constitutes a risk of collision for the vehicle 21. For example, the vehicle 21 has vehicle-to-X communication means based on WLAN and by means of a radar sensor. By means of the vehicle-to-X communication means, the vehicle 21 can continuously detect the location, the direction of movement and the speed of the vehicle 23. The radar sensor which is also arranged on the vehicle 21 can, on the other hand, not continuously detect the vehicle 23. However, since a small portion of the radar signal which is output by the vehicle 21 propagates away under the vehicle 22 and is therefore reflected by the vehicle 23, the vehicle 21 can receive, by means of the radar sensor, an irregular and frequently interrupted radar signal from the vehicle 23. According to the inventive method, the radar information which is present in a discontinuous fashion is used for the safe and reliable validation of the vehicle-to-x information. The vehicle 21 therefore has a validated information item relating to the location, the direction of movement and the speed of the vehicle 23. This information is both output to the driver as a warning and also made available to a braking assistant which performs a braking intervention after the expiry of a driver reaction time period not used by the driver, in order to avoid a collision with the vehicle 23.

Figure 3:
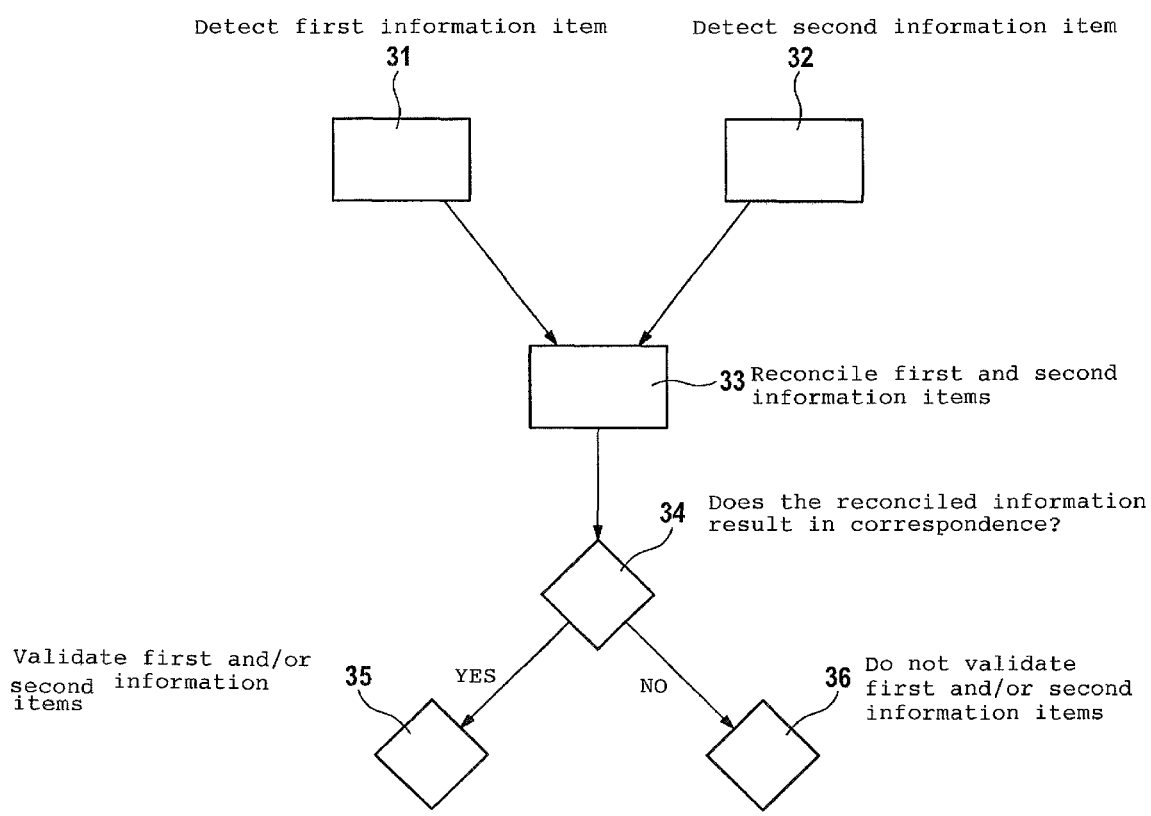
FIG. 3 shows a flowchart which represents the individual sequence steps of the method for validating the information.

FIG. 3 shows by way of example the sequence of the method according to the invention for validating information by means of a flowchart. In step 31, a first information item is detected continuously by means of a vehicle-to-X communication device. At the same time, in step 32 a second information item is detected in a discontinuous and irregular fashion by means of an individual sensor. In step 33, the information content of the first and the second information items is reconciled. The fact that the second information item and therefore its information content are not continuously available is, for example, insignificant. The information reconciliation takes place independently of the chronological continuity of the second information item. However, what is significant is the fact that there must be a chronological overlap during the detection of the first information item and that of the second information item. In the following step 34, it is then checked whether the reconciliation of the information contents of the first and second information items resulted in correspondence. If correspondence was detected, the first and/or second information items are validated in step 35. If no correspondence was detected, no validation is performed in step 36.

The invention claimed is:
1. A method performed by a vehicle on the roadway for validating information of an object on or near the roadway that is remote from the vehicle, comprising:
   receiving continuously at least for a duration, by a vehicle-to-X communication transceiver located in the vehicle, a first location of the object on or near the roadway indicating an absolute position of the object on or near the roadway;
   detecting discontinuously, by at least one individual sensor or a group of sensors located in the vehicle and coupled to the vehicle-to-X communication transceiver, a second location of the object on or near the roadway indicating a relative position of the object on or near the roadway relative to the vehicle;
   validating, by a processor located in the vehicle, the first location of the object on or near the roadway when:
      1) both the first location is received and the second location is detected within a predetermined time frame such that there is a chronological overlap between receiving the first location and detecting the second location, and
      2) the first location is at or near the second location; and
   in response to the first location being validated, controlling, by the processor located in the vehicle at least one of: a warning output to the driver, or an action that intervenes with driving of the vehicle.

2. The method as claimed in claim 1, wherein the at least one individual sensor is a sensor of the generic type:
radar,
lidar,
laser scanner,
ultrasound sensor,
mono camera,
stereo camera,
wheel speed sensor,
acceleration sensor,
rotational speed sensor or
steering angle sensor.

3. The method as claimed in claim 1, wherein the group of sensors is a group of individual sensors of the same generic type and/or of different generic types.

4. The method as claimed in claim 3, wherein the locations determined by the individual sensors of the group of sensors are merged to form a common composite location.

5. The method as claimed in claim 1, wherein the first and second locations are additionally grouped with at least one of a position, a direction of movement, a speed and a generic type of an object.

6. The method as claimed in claim 1, wherein the information contents of the first and second locations are not merged.

7. The method as claimed in claim 1, wherein the first and/or second location is no longer categorized as being validated if the first location is no longer detected continuously.

8. The method as claimed in claim 1, wherein the validated location is made available at least to a driver assistance system in a vehicle.

9. The method as claimed in claim 1, wherein the validated first location or validated second location have a high degree of reliability which is sufficient for a vehicle control intervention.

10. The method as claimed in claim 1, wherein the first location is used to reduce a threshold value of an object detection process, wherein the object detection process is performed by means of the at least one individual sensor and/or the group of sensors.

11. A system of a vehicle for validating information of an object on or near a roadway that is remote from the vehicle, comprising:
a vehicle-to-X communication transceiver located in the vehicle and configured to:
continuously receive a first location of the object on or near the roadway at least for a duration, indicating an absolute position of the object on or near the roadway,
an individual sensor, or a group of sensors located in the vehicle and configured to:
discontinuously detect a second location of the object on or near the roadway, indicating a relative position of the object on or near the roadway relative to the vehicle,
a processor located in the vehicle and configured to:
validate the first location of the object on or near the roadway when:
1) both the first location is received and the second location is detected within a predetermined time frame such that there is a chronological overlap between receiving the first location and detecting the second location,
2) the first location is at or near the second location, and
in response to the first location being validated, control a warning output to the driver, or an action that intervenes with driving of the vehicle.

12. The system as claimed in claim 11, wherein in that the vehicle-to-X communication device exchanges information on the basis of at least one of the following types of link:
WLAN link, in particular according to IEEE 802.11,
ISM link (Industrial, Scientific, Medical Band),
ZigBee,
Bluetooth,
UWB,
Infrared link and
Mobile radio link.

13. The system as claimed in claim 11, including:
another processor included in an electronic information merging module being assigned to the group of sensors, the electronic information merging module merges locations detected by the individual sensors of the group of sensors to form a common composite location, and
wherein the processor is included in an electronic information reconciling module.

14. The system as claimed in claim 13, wherein the electronic information reconciling module and the electronic information merging module comprise partially or completely common data processing means.

15. The system as claimed in claim 13, wherein the electronic information reconciling module and/or the electronic information merging module are assigned to any desired vehicle control unit, wherein they are, in particular, partially or completely identical to an electronic computing module which is assigned to the vehicle control unit.

16. A non-transitory computer readable medium including software code stored thereon that controls a motor vehicle to perform the steps of:
continuously receiving, by a vehicle-to-X communication transceiver located in the vehicle, a first location of an object on or near the roadway, at least for a duration, indicating an absolute position of the object on or near the roadway,
discontinuously detecting, by at least one individual sensor or a group of sensors located in the vehicle, a second location of the object on or near the roadway, indicating a relative position of the object on or near the roadway relative to the vehicle,
validating, by a processor located in the vehicle, the first location of the object on or near the roadway when:
1) both the first location is received and the second location is detected within a predetermined time frame such that there is a chronological overlap between receiving the first location and detecting the second location, and
2) the first location is at or near the second location, and
in response to the first location being validated, controlling, by the processor located in the vehicle at least one of: a warning output to the driver, or an action that intervenes with driving of the vehicle.

17. The method as claimed in claim 1, wherein the first location and the second location are additionally grouped with at least one of a direction, and a speed of the object on or near the roadway.

* * * * *